(12) United States Patent
Hassan et al.

(10) Patent No.: US 11,394,551 B2
(45) Date of Patent: Jul. 19, 2022

(54) SECURE AUTHENTICATION USING PUNCTURING

(71) Applicant: Microsoft Technology Licensing, LLC, Redmond, WA (US)

(72) Inventors: Amer Aref Hassan, Kirkland, WA (US); Edward C. Giaimo, III, Bellevue, WA (US); Russell Andrew Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 16/514,747

(22) Filed: Jul. 17, 2019

(65) Prior Publication Data

US 2021/0021420 A1 Jan. 21, 2021

(51) Int. Cl.
*H04L 9/32* (2006.01)
*H04L 9/40* (2022.01)

(52) U.S. Cl.
CPC .......... *H04L 9/3226* (2013.01); *H04L 63/083* (2013.01); *H04L 63/102* (2013.01); *H04L 2209/16* (2013.01); *H04L 2209/34* (2013.01)

(58) Field of Classification Search
CPC .................................................. H04L 9/3226
See application file for complete search history.

(56) References Cited

U.S. PATENT DOCUMENTS 5,267,299 A 11/1993 Nomura
5,680,470 A 10/1997 Moussa et al.
5,815,665 A 9/1998 Teper et al.
6,079,021 A 6/2000 Abadi et al.
6,081,570 A 6/2000 Ghuman et al.
(Continued)

FOREIGN PATENT DOCUMENTS

CN 101197095 A 6/2008
EP 1050986 A2 11/2000
(Continued)

OTHER PUBLICATIONS

"Notice of Allowance Issued in U.S. Appl. No. 16/436,809", dated Jul. 10, 2020, 24 Pages.
(Continued)

*Primary Examiner* — Simon P Kanaan
(74) *Attorney, Agent, or Firm* — Schwegman Lundberg & Woessner, P.A.

(57) ABSTRACT

Disclosed are systems, methods, and non-transitory computer-readable media for secure authentication using puncturing. An authentication system receives an encoded obfuscated authentication credential as part of an authentication request and accesses a stored authentication credential. The authentication system performs a puncturing of the encoded obfuscated authentication credential. The resulting punctured authentication credential includes a subset of individual values from the encoded obfuscated authentication credential. The authentication determines whether the punctured encoded data input corresponds to at least a portion of the stored authentication credential. In response to determining that the punctured encoded data input corresponds to at least a portion of the stored authentication credential, the authentication system approves the authentication request.

17 Claims, 7 Drawing Sheets

(56) References Cited

U.S. PATENT DOCUMENTS

| | | |
|---|---|---|
| 6,195,698 B1 | 2/2001 | Lillibridge et al. |
| 6,954,862 B2 | 10/2005 | Serpa |
| 7,215,727 B2 | 5/2007 | Yousef et al. |
| 7,451,322 B2 | 11/2008 | Lee |
| 7,552,467 B2 | 6/2009 | Lindsay |
| 7,581,113 B2 | 8/2009 | Smith et al. |
| 7,600,128 B2 | 10/2009 | Pritchard et al. |
| 7,653,818 B2 | 1/2010 | Serpa |
| 7,890,768 B2 | 2/2011 | Singh et al. |
| 8,140,854 B2 | 3/2012 | Ogawa |
| 8,272,040 B2 | 9/2012 | Chaudhry et al. |
| 8,578,476 B2 | 11/2013 | Sama |
| 8,667,280 B2 | 3/2014 | Sama |
| 8,918,836 B2 | 12/2014 | Schechter et al. |
| 9,172,697 B1 | 10/2015 | Holtz |
| 9,237,150 B2 | 1/2016 | Yun et al. |
| 9,524,395 B2 | 12/2016 | Selander et al. |
| 9,536,067 B1 | 1/2017 | Lee |
| 9,600,658 B2 | 3/2017 | Kanzaki et al. |
| 9,606,983 B1 | 3/2017 | Mcclintock et al. |
| 9,626,494 B2 | 4/2017 | Milya |
| 9,626,506 B1 | 4/2017 | Shetty et al. |
| 9,632,603 B2 | 4/2017 | Fang et al. |
| 9,722,966 B2 | 8/2017 | Pandya et al. |
| 9,722,996 B1 | 8/2017 | Kolman et al. |
| 9,876,782 B2 | 1/2018 | Holtz |
| 9,946,867 B1 | 4/2018 | Ramalingam et al. |
| 10,091,188 B2 | 10/2018 | Xiao et al. |
| 10,284,547 B2 | 5/2019 | Holtz |
| 10,326,798 B2 * | 6/2019 | Lambert ............ H04L 63/0428 |
| 10,395,065 B2 | 8/2019 | Kong et al. |
| 10,540,492 B1 | 1/2020 | Norris, III |
| 10,708,058 B2 | 7/2020 | Le Scouarnec et al. |
| 10,812,482 B1 | 10/2020 | Xu et al. |
| 10,866,699 B1 | 12/2020 | Hassan et al. |
| 11,055,394 B2 * | 7/2021 | Norris, III ............ G06F 21/36 |
| 11,240,227 B2 | 2/2022 | Hassan et al. |
| 2002/0029341 A1 | 3/2002 | Juels et al. |
| 2002/0108046 A1 | 8/2002 | Armingaud |
| 2002/0144158 A1 | 10/2002 | Hekimian |
| 2003/0078949 A1 | 4/2003 | Scholz et al. |
| 2003/0172281 A1 | 9/2003 | Lee |
| 2005/0273625 A1 | 12/2005 | Dayan et al. |
| 2006/0294392 A1 * | 12/2006 | Veprek ................ G06F 21/31 713/183 |
| 2007/0127458 A1 | 6/2007 | Small et al. |
| 2008/0066167 A1 | 3/2008 | Andri |
| 2008/0320310 A1 | 12/2008 | Florencio et al. |
| 2009/0064278 A1 | 3/2009 | Harris |
| 2009/0106825 A1 | 4/2009 | Cerruti et al. |
| 2009/0106827 A1 | 4/2009 | Cerruti et al. |
| 2009/0282062 A1 | 11/2009 | Husic |
| 2010/0057709 A1 | 3/2010 | Kawanaka et al. |
| 2010/0192205 A1 | 7/2010 | Chaudhry et al. |
| 2011/0225638 A1 | 9/2011 | Nahari |
| 2011/0271118 A1 | 11/2011 | Mahmoud et al. |
| 2012/0304302 A1 | 11/2012 | Stecher |
| 2012/0317464 A1 | 12/2012 | Yoshiyama |
| 2013/0061298 A1 | 3/2013 | Longobardi et al. |
| 2013/0152193 A1 | 6/2013 | Cheng |
| 2013/0238903 A1 * | 9/2013 | Mizunuma ............ H04L 63/08 713/176 |
| 2013/0254875 A1 | 9/2013 | Sama |
| 2013/0283337 A1 | 10/2013 | Schechter et al. |
| 2013/0333007 A1 | 12/2013 | Chougle et al. |
| 2014/0101744 A1 | 4/2014 | Liu et al. |
| 2014/0165169 A1 | 6/2014 | Buck |
| 2014/0165175 A1 | 6/2014 | Sugiyama |
| 2014/0223189 A1 | 8/2014 | Gao et al. |
| 2014/0245433 A1 | 8/2014 | Bao et al. |
| 2014/0281506 A1 | 9/2014 | Redberg et al. |
| 2014/0310805 A1 | 10/2014 | Kandekar |
| 2014/0317705 A1 | 10/2014 | Eluard et al. |
| 2014/0365782 A1 | 12/2014 | Beatson et al. |
| 2014/0373088 A1 | 12/2014 | Aggarwal et al. |
| 2015/0172275 A1 | 6/2015 | Milya |
| 2015/0294109 A1 | 10/2015 | Kanzaki et al. |
| 2015/0312040 A1 | 10/2015 | Zheng |
| 2015/0324579 A1 | 11/2015 | Qian et al. |
| 2015/0363593 A1 | 12/2015 | Joye |
| 2016/0021094 A1 | 1/2016 | Dong et al. |
| 2016/0050209 A1 | 2/2016 | Tipnis et al. |
| 2016/0078216 A1 | 3/2016 | Chougle et al. |
| 2016/0125182 A1 | 5/2016 | Miura et al. |
| 2017/0185806 A1 | 6/2017 | Kong et al. |
| 2017/0207909 A1 | 7/2017 | Whatmough et al. |
| 2017/0208091 A1 | 7/2017 | Whitsell et al. |
| 2017/0272100 A1 | 9/2017 | Yanovsky et al. |
| 2017/0351659 A1 | 12/2017 | Amend et al. |
| 2017/0373858 A1 | 12/2017 | Mandal et al. |
| 2018/0097794 A1 | 4/2018 | Brown |
| 2018/0114003 A1 | 4/2018 | Uenishi |
| 2018/0159679 A1 | 6/2018 | De Ruijter et al. |
| 2018/0191702 A1 | 7/2018 | Padmanabhan et al. |
| 2018/0278421 A1 | 9/2018 | Karabina et al. |
| 2019/0080060 A1 | 3/2019 | Lee |
| 2019/0103955 A1 | 4/2019 | Lee et al. |
| 2019/0141022 A1 | 5/2019 | Reeve et al. |
| 2019/0236262 A1 | 8/2019 | Yamada |
| 2019/0272370 A1 | 9/2019 | Hassan et al. |
| 2020/0137038 A1 | 4/2020 | Endler |
| 2020/0387592 A1 | 12/2020 | Hassan et al. |
| 2020/0389441 A1 | 12/2020 | Hassan et al. |
| 2020/0389442 A1 | 12/2020 | Hassan |
| 2020/0389443 A1 | 12/2020 | Hassan et al. |
| 2020/0389444 A1 | 12/2020 | Hassan et al. |
| 2020/0389445 A1 | 12/2020 | Hassan et al. |
| 2020/0389446 A1 | 12/2020 | Hassan et al. |
| 2021/0021372 A1 | 1/2021 | Hassan et al. |
| 2021/0036898 A1 | 2/2021 | Hassan et al. |
| 2021/0157900 A1 | 5/2021 | Sethi et al. |

FOREIGN PATENT DOCUMENTS

| | | |
|---|---|---|
| FR | 2862144 A1 | 5/2005 |
| JP | 2011113523 A | 6/2011 |
| JP | 2012133717 A | 7/2012 |
| WO | 2004021108 A2 | 3/2004 |
| WO | 2008082354 A1 | 7/2008 |

OTHER PUBLICATIONS

Alghathbar, et al., "Noisy Password Scheme: A New One Time Password System", In Canadian Conference on Electrical and Computer Engineering, May 3, 2009, pp. 841-846.

"International Search Report and Written Opinion Issued in PCT Application No. PCT/US2020/030317", dated Jun. 23, 2020, 11 Pages.

"International Search Report and Written Opinion Issued in PCT Application No. PCT/US2020/030318", dated Jun. 24, 2020, 11 Pages.

"Final Office Action Issued in U.S. Appl. No. 16/514,778", dated Nov. 30, 2020, 25 Pages.

Kaiser, et al., "Undetected Errors in Quasi-Cyclic LDPC Codes Caused by Receiver Symbol Slips", In Proceedings of IEEE Global Telecommunications Conference, Nov. 30, 2009, 6 Pages.

Luo, et al., "A Mobile Authentication System Resists to Shoulder-Surfing Attacks", In Journal of Multimedia Tools and Applications, Dec. 8, 2015, pp. 14075-14087.

"International Search Report and Written Opinion Issued in PCT Application No. PCT/US20/030315", dated Aug. 10, 2020, 16 Pages.

"International Search Report and Written Opinion Issued in PCT Application No. PCT/US20/033474", dated Aug. 11, 2020, 11 Pages.

U.S. Appl. No. 16/436,721, filed Jun. 10, 2019, Authentication With Random Noise Symbols and Pattern Recognition.

U.S. Appl. No. 16/436,679, filed Jun. 10, 2019, Authentication With Random Noise Symbols and Pattern Recognition.

U.S. Appl. No. 16/436,809, filed Jun. 10, 2019, User Interface for Authentication With Random Noise Symbols.

(56) References Cited

OTHER PUBLICATIONS

U.S. Appl. No. 16/436,802, filed Jun. 10, 2019, Pattern Matching for Authentication With Random Noise Symbols and Pattern Recognition.
U.S. Appl. No. 16/436,688, filed Jun. 10, 2019, Authentication With Well-Distributed Random Noise Symbols.
U.S. Appl. No. 16/436,728, filed Jun. 10, 2019, Partial Pattern Recognition in a Stream of Symbols.
U.S. Appl. No. 16/436,745, filed Jun. 10, 2019, Partial Pattern Recognition in a Stream of Symbols.
U.S. Appl. No. 16/436,750, filed Jun. 10, 2019, Partial Pattern Recognition in a Stream of Symbols.
U.S. Appl. No. 16/531,041, filed Aug. 3, 2019, Device Synchronization With Noise Symbols and Pattern Recognition.
"Use of Input Distance Metric to Implement Fuzzy Password Matching", Published by IP.Com Electronic Publication, Apr. 2, 2015, 2 Pages.
"International Search Report and Written Opinion Issued in PCT Application No. PCT/US20/029992", dated Jul. 31, 2020, 11 Pages.
Gomaa, et al., "A Survey of Text Similarity Approaches", In International Journal of Computer Applications, vol. 68, Issue 13, Apr. 1, 2013, pp. 13-18.
Mark, et al., "The Stringdist Package for Approximate String Matching", Published in the R Journal, vol. 6, Issue1, Jun. 1, 2014, pp. 111-122.
"International Search Report and Written Opinion Issued in PCT Application No. PCT/US20/029991", dated Jul. 31, 2020, 11 Pages.
"Non Final Office Action Issued in U.S. Appl. No. 16/436,809", dated Mar. 6, 2020, 19 Pages.
Alsaiari, Hussains. , "Graphical One-Time Password Authentication", In Thesis of Plymouth University, May 2016, 460 Pages.
Forget et al., "Persuasion for Stronger Passwords: Motivation and Pilot Study", In Proceedings of the 3rd international conference on Persuasive Technology, Jun. 4, 2008, pp. 140-150.
Griffin, Phillip H., "Secure Authentication on the Internet of Things", In Proceeding of SoutheastCon, Mar. 30, 2017, 5 Pages.
"Non Final Office Action Issued in U.S. Appl. No. 16/514,778", dated Aug. 19, 2020, 25 Pages.
"International Search Report & Written Opinion Issued in PCT Application No. PCT/US20/029993", dated Apr. 23, 2021, 8 Pages.
"Non Final Office Action Issued in U.S. Appl. No. 16/436,728", dated Mar. 18, 2021, 24 Pages.
"International Search Report and Written Opinion Issued in PCT Application No. PCT/US20/036865", dated Sep. 23, 2020, 12 Pages.
"International Search Report and Written Opinion Issued in PCT Application No. PCT/US20/033475", dated Aug. 28, 2020, 11 Pages.
Chatterjee, et al., "The TypTop System: Personalized Typo-Tolerant Password Checking", In Proceedings of the ACM SIGSAC Conference on Computerand Communications Security, Oct. 30, 2017, 20 Pages.
"Non Final Office Action Issued in U.S. Appl. No. 16/436,750", dated Jun. 14, 2021, 26 Pages.
"Non Final Office Action Issued in U.S. Appl. No. 16/436,679", dated Jun. 24, 2021, 23 Pages.
"Non Final Office Action Issued in U.S. Appl. No. 16/436,745", dated Jun. 29, 2021, 17 Pages.
"Non Final Office Action Issued in U.S. Appl. No. 16/514,778", dated Apr. 16, 2021, 23 Pages.
Alghathbar, et al., "Noisy Password Security Technique", In the Proceedings of International Conference for Internet Technology and Secured Transactions, Nov. 9, 2009, 5 Pages.
Florencio, et al., "KLASSP: Entering Passwords on a Spyware Infected Machine Using a Shared-Secret Proxy", In the Proceedings of 22nd Annual Computer Security Applications Conference, Dec. 11, 2006, 10 Pages.
"International Search Report and Written Opinion Issued in PCT Application No. PCT/US20/030319", dated Jul. 3, 2020, 11 Pages.
"International Search Report and Written Opinion Issued in PCT Application No. PCT/US20/030331", dated Jul. 24, 2020, 13 Pages.
"Non Final Office Action Issued in U.S. Appl. No. 16/436,688", dated Aug. 5, 2021, 21 Pages.
"Notice of Allowance Issued in U.S. Appl. No. 16/436,750", dated Sep. 28, 2021, 10 Pages.
Gutierrez, et al., "Inhibiting and Detecting Offline Password Cracking Using ErsatzPasswords", In ACM Transactions on Privacy and Security, vol. 19, Issue 3, Dec. 12, 2016, 30 Pages.
Mayer, et al., "I (Don't) See What You Typed There! Shoulder-Surfing Resistant Password Entry on Gamepads", In Proceedings of the CHI Conference on Human Factors in Computing Systems, May 4, 2019, 12 Pages.
Riesen, et al., "Sketch-Based User Authentication With a Novel String Edit Distance Model", In IEEE Transactions on Systems, Man, and Cybernetics: Systems, vol. 48, Issue 3, Mar. 2018, pp. 460-472.
"Non Final Office Action Issued in U.S. Appl. No. 16/436,721", dated Nov. 23, 2021, 23 Pages.
"Non Final Office Action Issued in U.S. Appl. No. 16/436,802", dated Feb. 28, 2022, 13 Pages.
"Final Office Action Issued in U.S. Appl. No. 16/436,688", dated Mar. 15, 2022, 27 Pages.
"Final Office Action Issued in U.S. Appl. No. 16/436,721", dated Apr. 18, 2022, 30 Pages.
"Non Final Office Action Issued in U.S. Appl. No. 16/436,745", dated May 2, 2022, 14 Pages.

* cited by examiner

US 11,394,551 B2

SECURE AUTHENTICATION USING PUNCTURING

TECHNICAL FIELD

An embodiment of the present subject matter relates generally to authentication and, more specifically, to providing secure authentication using puncturing.

BACKGROUND

Current technology allows users to perform a wide variety of tasks by providing proper authentication. For example, online services allow users to access their bank accounts, transfer funds, access personal information, purchase items, etc., by simply providing their user name and password. While these types of online services provide convenience to users, they also create new security concerns. For example, an ill-intentioned user with knowledge of another user's user name and password can access that user's bank account, transfer funds, etc. Accordingly, providing secure authentication is a growing concern.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
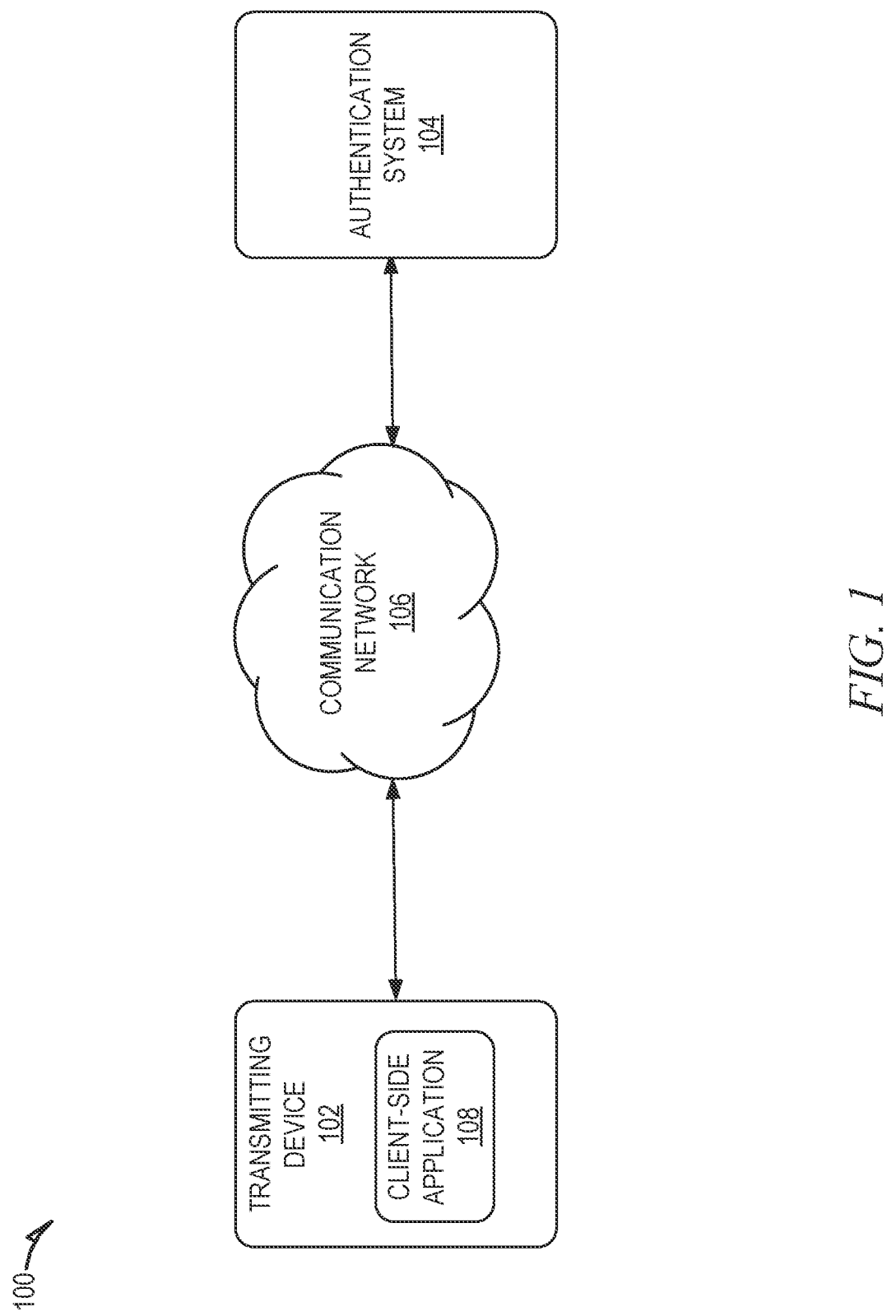
FIG. 1 is a block diagram illustrating an example system for secure authentication using puncturing, in accordance with some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for secure authentication using puncturing. An authentication system is used to restrict access to access-controlled resources. An access-controlled resource is any type of physical or digital object, account, area, etc., that is associated with an authentication requirement. The authentication requirement limits access to the access-controlled resource to a set of authorized users. That is, the authentication requirement is used to allow authorized users to access the access-controlled resource while restricting unauthorized users from accessing the access-controlled resource.

An example of an access-controlled resource is an email account facilitated by an online service. An authentication requirement, such as requiring a user to provide correct authentication credentials (e.g., a user name and password associated with the email account), can be used to restrict access to the email account to authorized users. For example, an authorized user can provide the user name and password to access the email account, while an unauthorized user that does not have knowledge of the user name and password cannot access the email account. As another example, an access-controlled resource may be a digital file or set of digital files. An authentication requirement, such as prompting a user for a user name and password, can be used to restrict access to the digital file or set of digital files to authorized users, such as a set of designated employees of a company. As another example, an access-controlled resource may be a server room located within a building. An authentication requirement, such as requiring a user to enter a correct code, can be used to limit access to the server room to authorized users. For example, authorized users can use the code to access the server room, while unauthorized users that do not know the code cannot access the server room.

As part of an authentication request (e.g., a user attempting to access the access-controlled resource), a user provides an authentication credential (e.g., username/password, code, etc.) to satisfy an authentication requirement implemented by the authentication system that limits access to the access-controlled resource. The authentication system compares the received authentication credential to a stored authentication credential associated with the access-controlled resource to determine whether to approve or deny the authentication request. The authentication system approves the authentication attempt if the authentication credential provided by the user matches the stored authentication credential associated with the access-controlled resource. Alternatively, the authentication system denies the authentication attempt if the authentication credential provided by the user does not match the stored authentication credential.

Maintaining the security of the authentication credential associated with an access-controlled resource is critical to properly restricting access to authorized users. For example, an unauthorized user that has knowledge of the authentication credential (e.g., password) associated with an access-controlled resource may simply use the authentication credential to satisfy the authentication requirement and gain access to the access-controlled resource. An ill-intentioned user that is not authorized to access an access-controlled resource may attempt to learn the authentication credential to gain access to the access-controlled resource. For example, an ill-intentioned user may attempt to spy on an authorized user as the authorized user types the authentication credential (e.g., using a keyboard, touchscreen, keypad, etc.). As another example, an ill-intentioned user may install a keylogger on a computing device being used by the authorized user that monitors the keys typed by an authorized user during an authentication request. As another example, an ill-intentioned user may use a man-in-the middle attack that intercepts data transmissions transmitted as part of an authentication request that include the authentication credential.

To provide authentication that is secure from these types of attacks, the authentication system uses the addition of noise values to the authentication credential along with puncturing. Noise values are one or more values added to the authentication credential to obfuscate the authentication credential. The noise values are not part of the authentication credential but are added to hide the authentication credential. The addition of the noise values to the authentication credential results in an obfuscated authentication credential, which is meant to confuse an ill-intentioned user. For example, an ill-intentioned user will be uncertain as to which values are part of the authentication credential and which values are noise.

In one example, an authorized user may add noise values when typing an authentication credential, such as a password. The added noise values are not a part of the password itself. The additional of the noise values obfuscate the entered authentication credential from an ill-intentioned user spying on the authentication request (e.g., spying of the user's keyboard, using a keylogger, intercepting data transmissions). For example, the ill-intentioned user may be unaware that noise values have been added to the authentication credential and thus is fooled into believing that the authentication credential includes the added noise values. Alternatively, the ill-intentioned user may be aware that noise values were added to the authentication credential, however will be uncertain as to which values are added as noise and which are part of the authentication credential.

As another example, a transmitting device (e.g., the computing device of the authorized user) may add noise values to the authentication credential. For example, the transmitting device adds one or more noise values to an authentication credential prior to transmitting the authentication credential to the authentication system as part of an authentication request. In this type of embodiment, an authorized user enters the correct authentication credential (e.g., using a keyboard, touchpad, etc.) and the transmitting device adds the noise values to the entered authentication credential prior to transmission. This provides protection against man in the middle type attacks where the data transmission transmitted as part of an authentication request are intercepted by an ill-intentioned user. The addition of the noise values obfuscates the transmitted authentication credential, which may prevent an ill-intentioned user from properly determining the authentication credential.

Adding noise values provides additional security during the authentication process, however it also provides technical challenges. Specifically, the authentication system is tasked with determining whether an obfuscated authentication credential (e.g., an authentication credential with added noise values) received during an authentication request properly matches the stored authentication credential. This may involve determining which values constitute the authentication credential provided by a user and which values have been added as noise. One solution is to add noise values at certain positions in the authentication credential or use specified patterns to add noise values, however, this may make it easier for an ill-intentioned user to determine the authentication credential. For example, an ill-intentioned user with knowledge of the positions or pattern used to add noise values may be able to easily discern the true authentication credential from the obfuscated authentication credential.

To alleviate this issue, the authentication system uses a puncturing process, whereby individual values from an obfuscated authentication credential are removed to generate a punctured authentication credential. The authentication system may select the individual values to remove from the obfuscated authentication credential at random, based on a predetermined order, and/or based on historical data. The authentication system uses the punctured authentication credential to determine whether to approve or deny the authentication request. That is, the authentication system determines whether the punctured authentication credential satisfies the authentication requirement (e.g., corresponds to the stored authentication credential). For example, the authentication system may determine whether the punctured authentication credential is an exact match with the stored authentication credential or satisfies a threshold similarity with the stored authentication credential. The authentication system approves the authentication request in response to determining that the punctured authentication credential corresponds to the stored authentication credential. Alternatively, the authentication system may deny the authentication request in response to determining that the punctured authentication credential does not correspond to the stored authentication credential.

To confirm whether an obfuscated authentication credential corresponds to the stored authentication credential, the authentication system may repeat the puncturing process multiple times. For example, the authentication system selects different combinations of individual values from the obfuscated authentication credential to generate multiple punctured authentication credentials. The authentication system determines whether any of the punctured authentication credentials correspond to the stored authentication credential. The authentication system may repeat this process until a punctured authentication credential is determined to correspond to the stored authentication credential, a timeout occurs, or each potential punctured authentication credential has been generated and determined to not correspond to the stored authentication credential. The authentication system may perform the puncturing process sequentially or in sequence. For example, the authentication system may generate multiple punctured authentication credentials at the same or, alternatively, in response to each previously generated punctured authentication credential being determined to not correspond to the stored authentication credential.

In some embodiments, a transmitting device encodes an authentication credential prior to transmission to the authentication system. For example, the transmitting device uses a data encoder that encodes each character of the authentication credential to add redundancy to the transmitted data. In turn, the authentication system uses a data decoder to decode each encoded character of the authentication credential. The added redundancy allows the authentication system to correct errors that occur during transmission. For example, each character of the authentication credential is transmitted as an ordered set of individual values, such as a binary number made up of an ordered set of zeroes and ones (e.g., 0001, 0010, etc.). An error during transmission may result in one or more of the individual values being received incorrectly by the authentication system. Encoding the authentication credential to add redundancy (e.g., repeating some or all of the individual values) results in a longer ordered set of individual values that is transmitted to the authentication system. For example, the ordered set of individual values '0001' may be encoded into multiple data blocks that repeat the ordered set of individual values (e.g., 0001 0001 0001 0001) or data blocks that repeat each individual value from the data input (e.g., 0000 0000 0000 1111). In the event an error occurs during transmission, the added redundant data allows the data decoder to properly to determine the correct ordered set of individual values. For example, if an error occurs during transmission and one the data blocks is received incorrectly (e.g., 0110 0001 0001 0001), the data decoder can determine that the correct ordered set of individual values is '0001' because the majority of the data blocks are '0001' rather than '0110'.

In embodiments in which the authentication credential is encoded by the transmitting device, the noise values may be added prior to encoding the authentication credential or after the authentication credential has been encoded (e.g., added to the encoded authentication credential). For example, one or more noise values (e.g., characters) may be added to the authentication credential (e.g., by the user or transmitting device) provided by the user prior to the authentication credential being encoded by the data encoder. As a result, the data encoder encodes each noise value (e.g., character) added to the authentication credential as well as each value of the authentication credential itself. Alternatively, the noise values may be added to the authentication credential after it has been encoded. In this scenario, the noise values that are added are not encoded by the data encoder, but rather added to the encoding of one or more of the values (e.g., characters) of the authentication credential.

The authentication system may puncture an obfuscated authentication credential that has been encoded based on the manner in which the noise values were added to the authentication credential. For example, in embodiments in which the noise values were added prior to encoding (e.g., the noise values were encoded as part of the obfuscated authentication credential), the authentication system may remove one or more sets of individual values that correspond to a single encoded value. A character added to an authentication credential may be represented as an ordered set of individual values (e.g., 0001). Encoding the ordered set of individual values results in multiple data blocks that add redundancy to the ordered set of individual values (e.g., 0001 0001 0001 0001). To remove noise values from the obfuscated authentication credential, the authentication system removes the entire set of individual values (e.g., 0001 0001 0001 0001) that correspond to one encoded value (e.g., 0001). Alternatively, in embodiments in which the noise value is added to the authentication credential after encoding (e.g., the noise values are not encoded), the authentication system may remove individual values when puncturing the obfuscated authentication credential. For example, an authentication credential that is encoded into multiple data blocks to add redundancy to the ordered set of individual values (e.g., 0001 0001 0001 0001) may have one or more individual noise values added (e.g., 10001 01001 0001 0001) to obfuscate the authentication credential. In this type of embodiment, the authentication system may remove individual values (e.g., single bits) rather than the entire set of individual values (e.g., 0001 0001 0001 0001) that correspond to one encoded value (e.g., 0001).

FIG. 1 is a block diagram illustrating an example system 100 for secure authentication using puncturing, in accordance with some example embodiments. As shown, the system 100 includes a transmitting device 102, and an authentication system 104 connected to a communication network 106 and configured to communicate with each other through use of the communication network 106. The communication network 106 is any type of network, including a local area network (LAN), such as an intranet, a wide area network (WAN), such as the internet, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC), or an Internet of Things (IoT) device, such as a sensor, wearable, smart meter, etc. A computing device can include some or all of the features, components, and peripherals of the machine 700 shown in FIG. 7.

To facilitate communication with other computing devices, a computing device may include a communication interface configured to receive a communication, such as a request, data, and the like, from another computing device in network communication with the computing device and pass the communication along to an appropriate module running on the computing device. The communication interface also sends a communication to another computing device in network communication with the computing device.

The authentication system 104 manages access to an access-controlled resource. An access-controlled resource is any type of physical or digital object, account, area, etc., that is associated with an authentication requirement that must be satisfied to access the access-controlled resource. This is used to limit access to the access-controlled resource to a set of authorized users. The authentication system 104 enforces the authentication requirement to allow authorized users to access the access-controlled resource while restricting unauthorized users from accessing the access-controlled resource. An authentication requirement is satisfied by providing a correct authentication credential. For example, an authentication requirement may be providing a correct authentication credential such as a code, password or combination of a user name and password. As another example, authentication requirement may be providing a correct authentication credential such as specified identifying information (e.g., social security number, mother's maiden name, bank account balance, etc.), answer to personal question, etc.

One example of an access-controlled resource is an email account that is associated with an authentication requirement of providing a correct user name and password associated with the email account. Another example of an access-controlled resource is a digital file associated with an authentication requirement of providing a correct password. Yet another example of an access-controlled resource is a physical room that is associated with an authentication requirement of providing a correct code to access.

Users communicate with the authentication system 104 to request access to an access-controlled resource by using the transmitting device 102 that is connected to the communication network 106 by direct and/or indirect communication. For example, the user uses the transmitting device 102 to provide an authentication credential (e.g., password, code, user name/password, etc.) to the authentication system 104. The authentication system 102 determines whether the received authentication credential satisfies the authentication requirement and, if so, approves the authentication request. For example, the authentication system 104 provides the requesting user with access to the access-controlled resource or notifies an online service (e.g., email service, banking service, etc.) utilizing the functionality of the authentication system 104 that the user has satisfied the authentication requirement.

Although the shown system 100 includes only one transmitting device 102, this is for ease of explanation and is not meant to be limiting. One skilled in the art would appreciate that the system 100 can include any number of transmitting devices 102. Further, the authentication system 104 may concurrently accept connections from and interact with any number of transmitting devices 102. The authentication system 104 may support connections from a variety of different types of transmitting devices 102, such as desktop computers; mobile computers; mobile communications devices, e.g., mobile phones, smart phones, tablets; smart televisions; set-top boxes; keypads, and/or any other network enabled computing devices. Hence, the transmitting device 102 may be of varying type, capabilities, operating systems, and so forth.

Further, although the transmitting device 102 and the authentication system 104 are shown as separate entities, this is only one possible embodiment. In other embodiments, the transmitting device 102 and the authentication system 104 are incorporated as one device. For example, a keypad placed near a door may perform the functionality of both a receiving device 102 and the authentication system 104. For example, a user may user the keypad to enter an authentication credential, such as a password, to gain access to a room protected by the door. The keypad may perform the functionality of the authentication system 104 by determining whether the approve the authentication request (e.g., determining whether the entered authentication credential satisfies the authentication requirement). These examples, as well as others, need not require the use of the communication network 106, but may use direct communication between the transmitting device 102 and the authentication system 104 (or when embodied in a single device, may communicate as components of the single device).

In some embodiments, a user may interact with the authentication system 104 via a client-side application 108 installed on the transmitting device 102. In some embodiments, the client-side application 108 includes a component specific to the authentication system 104 or an online service (not shown) utilizing the functionality of the authentication system 104 to manage access to access-controlled resources. For example, the component may be a stand-alone application, one or more application plug-ins, and/or a browser extension. However, the users may also interact with the authentication system 104 via a third-party application, such as a web browser, that resides on the transmitting device 102 and is configured to communicate with the authentication system 104 or an online service (not shown) utilizing the functionality of the authentication system 104. In either case, the client-side application 108 presents a user interface (UI) for the user to interact with the authentication system 104. For example, the user interacts with the authentication system 104 via a client-side application 108 integrated with the file system or via a webpage displayed using a web browser application.

As part of an authentication request (e.g., a user attempting the access the access-controlled resource), a user provides an authentication credential (e.g., username/password, code, etc.) to the authentication system 104 to satisfy the authentication requirement enforced by the authentication system 104. The authentication requirement is enforced to limit access to the access-controlled resource. The authentication system 104 approves or denies the authentication request based on whether the received authentication credential satisfies the authentication requirement. For example, the authentication system 104 compares the received authentication credential to a stored authentication credential associated with the access-controlled resource to determine whether the received authentication credential matches the stored authentication credential or meets a similarity threshold with the stored authentication credential.

The authentication system 104 approves the authentication request if the authentication credential provided by the user satisfies the authentication requirement. Alternatively, the authentication system 104 denies the authentication request if the authentication credential provided by the user does satisfy the authentication requirement.

Maintaining the security of the authentication credential associated with an access-controlled resource is critical to properly restricting access to the access-controlled resource. For example, an unauthorized user that has knowledge of the authentication credential (e.g., password) associated with an access-controlled resource may simply use the authentication credential to satisfy the authentication requirement and gain access to the access-controlled resource. An ill-intentioned user that is not authorized to access an access-controlled resource may attempt to learn the authentication credential to gain access to the access-controlled resource. For example, an ill-intentioned user may attempt to spy on an authorized user as the authorized user types the authentication credential (e.g., using a keyboard, touchscreen, keypad, etc.). As another example, an ill-intentioned user may install a keylogger on a computing device being used by the authorized user that monitors the keys typed by an authorized user during an authentication request. As another example, an ill-intentioned user may use a man-in-the middle attack that intercepts data transmissions transmitted as part of an authentication request that include the authentication credential.

To provide authentication that is secure from these types of attacks, the authentication system 104 users a combination of noise values added to the authentication credential and data puncturing. Noise values are one or more values (e.g., characters, bits, etc.) added to the authentication credential to obfuscate the authentication credential. The noise values are not part of the authentication credential but are added to hide the authentication credential from an ill-intentioned user. The addition of the noise values to the authentication credential results in an obfuscated authentication credential that may confuse an ill-intentioned user. For example, an ill-intentioned user will be uncertain as to which values are part of the authentication credential and which values are added as noise.

In one example, an authorized user may add noise values when typing an authentication credential, such as a password. For example, the user may add additional characters, symbols, spaced, etc., that are not a part of the authentication credential. That is, the user may enter each character (e.g., letter, number, symbol, space, etc.) of the authentication credential along with one or more additional characters added as noise. The additional characters may be added at the beginning, end, and/or interspersed throughout the authentication credential. The addition of the noise values obfuscates the entered authentication credential from an ill-intentioned user spying on the authentication request (e.g., spying of the user's keyboard, using a keylogger, intercepting data transmissions). For example, the ill-intentioned user may be unaware that noise values have been added to the authentication credential and therefore fooled into believing that the authentication credential includes the added noise values. Alternatively, the ill-intentioned user may be aware that noise values were added to the authentication credential, however will be uncertain as to which values are added as noise and which are part of the authentication credential.

As another example, the transmitting device 102 (e.g., the client-side application 108) may add noise values to the authentication credential. For example, the client-side application 108 adds one or more noise values to an authentication credential prior to transmitting the authentication credential to the authentication system 104 as part of an authentication request. In this type of embodiment, an authorized user enters the correct authentication credential (e.g., using a keyboard, touchpad, etc.) and the client-side application 108 adds the noise values to the entered authentication credential prior to transmission. This provides protection against man in the middle type attacks where data transmissions transmitted as part of an authentication request are intercepted by an ill-intentioned user. The addition of the noise values obfuscates the transmitted authentication credential, which may prevent an ill-intentioned user from properly determining the authentication credential.

Adding noise values provides additional security during the authentication process, however it also provides technical challenges. Specifically, the authentication system 104 is tasked with determining whether an obfuscated authentication credential (e.g., an authentication credential with added noise values) received during an authentication request properly matches the stored authentication credential. This may involve determining which values constitute the authentication credential provided by a user and which values have been added as noise. One solution is to add noise values at certain positions in the authentication credential or use specified patterns to add noise values, however, this may make it easier for an ill-intentioned user to determine the authentication credential. For example, an ill-intentioned user with knowledge of the positions or pattern used to add noise values may be able to easily discern the true authentication credential from the obfuscated authentication credential.

To alleviate this issue, the authentication system 104 uses a puncturing process, whereby individual values from an obfuscated authentication credential are removed to generate a punctured authentication credential. The authentication system 104 may select the individual values to remove from the obfuscated authentication credential at random, based on a predetermined order, and/or based on historical data. The authentication system 104 uses the punctured authentication credential to determine whether to approve or deny the authentication request. That is, the authentication system 104 determines whether the punctured authentication credential satisfies the authentication requirement (e.g., corresponds to the stored authentication credential). For example, the authentication system 104 may determine whether the punctured authentication credential is an exact match with the stored authentication credential or satisfies a threshold similarity with the stored authentication credential. The authentication system 104 approves the authentication request in response to determining that the punctured authentication credential satisfies the authentication requirement (e.g., the punctured authentication credential corresponds to the stored authentication credential). Alternatively, the authentication system 104 may deny the authentication request in response to determining that the punctured authentication credential does not satisfy the authentication requirement (e.g., the punctured authentication credential does not correspond to the stored authentication credential).

To confirm whether an obfuscated authentication credential corresponds to the stored authentication credential, the authentication system 104 may repeat the puncturing process multiple times. For example, the authentication system 104 selects different combinations of individual values from the obfuscated authentication credential to generate multiple punctured authentication credentials. The authentication system determines 104 whether any of the punctured authentication credentials satisfy the authentication requirement (e.g., correspond to the stored authentication credential). The authentication system 104 may repeat this process until a punctured authentication credential is determined to correspond to the stored authentication credential, a timeout occurs, or each potential punctured authentication credential has been generated and determined to not correspond to the stored authentication credential. The authentication system 104 may perform the puncturing process sequentially or in sequence. For example, the authentication system 104 may generate multiple punctured authentication credentials at the same or, alternatively, in response to each previously generated punctured authentication credential being determined to not correspond to the stored authentication credential.

Use of the repeated puncturing process provides a technical improvement because it allows for greater flexibility when adding noise values to an authentication credential. The authentication system 104 generates multiple punctured versions of the obfuscated authentication credential, which are used to determine whether the authentication requirement is satisfied. As a result, the use of a predictable manner of adding noise values (e.g., adding at a predetermined position or according to a predetermined position) is not needed. This added flexibility in adding noise values results in increased security during the authentication process.

In some embodiments, the client-side application 108 encodes the authentication credential prior to transmission to the authentication system 104. For example, the client-side application 108 uses a data encoder that encodes each character of the authentication credential to add redundancy to the transmitted data. In turn, the authentication system 104 uses a data decoder to decode each encoded character of the authentication credential. The added redundancy allows the authentication system 104 to correct errors that occur during transmission. For example, each character of the authentication credential is transmitted as an ordered set of individual values, such as a binary number made up of an ordered set of zeroes and ones (e.g., 0001, 0010, etc.). An error during transmission may result in one or more of the individual values being received incorrectly by the authentication system 104. Encoding the authentication credential to add redundancy (e.g., repeating some or all of the individual values) results in a longer ordered set of individual values that is transmitted to the authentication system 104. For example, the ordered set of individual values '0001' may be encoded into multiple data blocks that repeat the ordered set of individual values (e.g., 0001 0001 0001 0001) or data blocks that repeat each individual value from the data input (e.g., 0000 0000 0000 1111). In the event an error occurs during transmission, the added redundant data allows the data decoder to properly to determine the correct ordered set of individual values. For example, if an error occurs during transmission and one the data blocks is received incorrectly (e.g., 0110 0001 0001 0001), the data decoder can determine that the correct ordered set of individual values is '0001' because the majority of the data blocks are '0001' rather than '0110'.

In embodiments in which the authentication credential is encoded by the client-side application 108, the noise values may be added prior to encoding the authentication credential or after the authentication credential has been encoded (e.g., added to the encoded authentication credential). For example, one or more noise values (e.g., characters) may be added to the authentication credential (e.g., by the user or client-side application 108) prior to the authentication credential being encoded by the data encoder. As a result, the data encoder encodes each noise value (e.g., character) added to the authentication credential as well as each value of the authentication credential itself. Alternatively, the noise values may be added to the authentication credential after the authentication credential has been encoded. For example, the data encoder encodes the authentication credential before noise values are added and the noise values are added to the resulting encoded authentication credential. In this of scenario, the noise values that are added are not encoded by the data encoder, but rather added to the encoding of one or more of the values (e.g., characters) of the authentication credential.

The authentication system 104 may puncture an obfuscated authentication credential that has been encoded (e.g., an encoded obfuscated authentication credential) based on the manner in which the noise values were added to the authentication credential. For example, in embodiments in which the noise values were added prior to encoding (e.g., the noise values were encoded as part of the obfuscated authentication credential), the authentication system 104 may puncture the encoded obfuscated authentication credential by removing one or more sets of individual values that correspond to a single encoded value. A character added to an authentication credential may be represented as an ordered set of individual values (e.g., 0001). Encoding the ordered set of individual values results in multiple data blocks that add redundancy to the ordered set of individual values (e.g., 0001 0001 0001 0001). To remove noise values from the encoded obfuscated authentication credential, the authentication system 104 removes the entire set of individual values (e.g., 0001 0001 0001 0001) that correspond to one encoded value (e.g., 0001).

Alternatively, in embodiments in which the noise value is added to the authentication credential after encoding (e.g., the noise values are not encoded), the authentication system 104 may remove individual values when puncturing the encoded obfuscated authentication credential. For example, an authentication credential that is encoded into multiple data blocks to add redundancy to the ordered set of individual values (e.g., 0001 0001 0001 0001) may have one or more individual noise values added to one or more of the data blocks (e.g., 10001 01001 0001 0001) to obfuscate the authentication credential. In this type of embodiment, the authentication system 104 may remove individual values (e.g., single bits) rather than the entire set of individual values (e.g., 0001 0001 0001 0001) that correspond to one encoded value (e.g., 0001).

Figure 2:
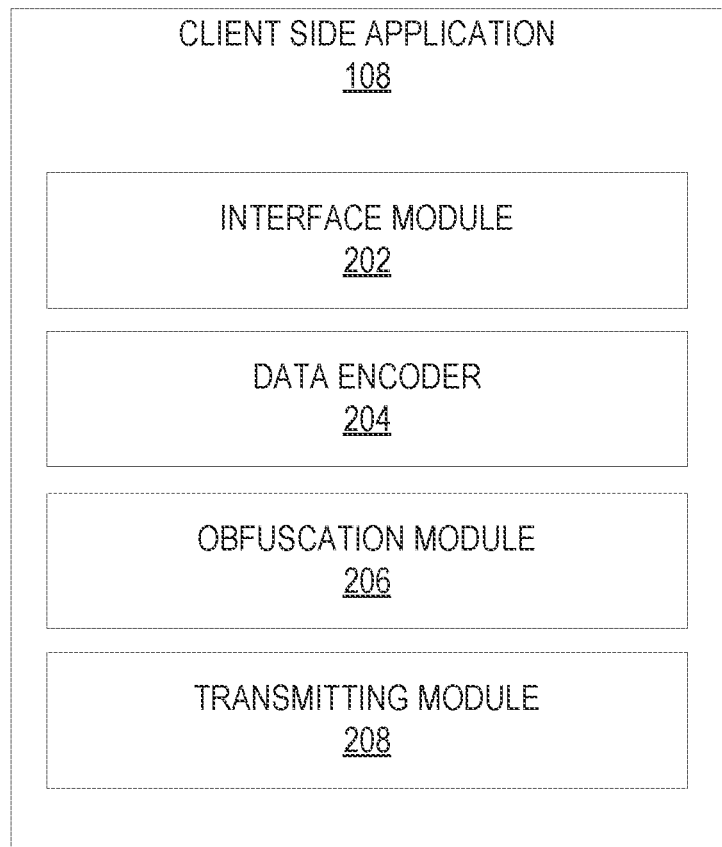
FIG. 2 is a block diagram of a client-side application, according to some example embodiments.

FIG. 2 is a block diagram of a client-side application 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the client-side application 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the client-side application 108 includes an interface module 202, a data encoder 204, an obfuscation module 206, and a transmitting module 208. The interface module 202 present a user interface on a display of a transmitting device 102. The user interface allows a user to interact with and/or use the functionality of the authentication system 104, as well as an online service that utilizes the functionality of the authentication system 104. For example, the interface module receives data from the authentication system 104 and/or on online service and presents the received data in the user interface presented on the display of the transmitting device 102. Further, the interface module 202 transmits data to the authentication system 104 and/or on online service, such as requests for specified data. For example, the interface module 202 may provide user interface elements (e.g., buttons, text boxes, etc.) within the user interface that allows a user to make selections, enter data, etc. The user may use these user interface elements to request to view data, causing the interface module 202 to transmit a request to the authentication system 104 and/or on online service for the requested data.

A user can use the functionality provided by the interface module 202 to initiate an authentication request associated with an access-controlled resource. For example, the user may initiate access to an access-controlled resource, such as by selecting a file or attempting to login to an account that has an associated authentication requirement. The user interface facilitated by the interface module 202 may present a prompt to enter the authentication credential that satisfies the authentication request. Further, the interface module 202 may enable a user to enter the authentication credential as part of the authentication request, including any noise values that the user wishes to add for security. For example, the user may enter one or more additional noise values (e.g., characters) into the authentication credential during the authentication request. The added noise values are used to obfuscate the authentication credential from an ill-intentioned user that is attempting to learn the authentication credential.

The data encoder 204 is a device or program implemented on the transmitting device 102 that converts data from its original format into another format (e.g., encodes data) prior to transmission. The data encoder 204 encodes an authentication credential prior to transmission of the authentication credential to the authentication system 104. For example, the data encoder 204 encodes each individual value (e.g., character) of the authentication credential using an error correction encoding technique such as Forward Error Correction (FEC) to add redundancy to the transmitted data. The added redundancy allows the authentication system 104 to correct errors that occur during transmission, such as one of the individual values being received incorrectly by the authentication system 104.

Encoding the authentication credential to add redundancy (e.g., repeating some or all of the individual values) results in a longer ordered set of individual values that is transmitted to the authentication system 104. For example, the data encoder 204 may encode an ordered set of individual values (e.g. 0001) into multiple data blocks that repeat the ordered set of individual values (e.g., 0001 0001 0001 0001) or data blocks that repeat each individual value from the data input (e.g., 0000 0000 0000 1111).

In the event an error occurs during transmission, the added redundant data allows the authentication system to determine the correct ordered set of individual values. For example, if an error occurs during transmission and one the data blocks is received incorrectly (e.g., 0110 0001 0001 0001), the authentication can determine that the correct ordered set of individual values (e.g., 0001) from the added redundant data (e.g., the majority of the data blocks are '0001' rather than '0110').

The obfuscation module 206 adds noise values to an authentication credential to generate an obfuscated authentication credential. In some embodiments, the client-side application 108 is tasked with adding noise values to an authentication credential, rather than a user entering the noise values. For example, the obfuscation module 206 adds one or more noise values to an authentication credential entered by a user prior to the authentication credential being transmitted to the authentication system 104 as part of an authentication request. In this type of embodiment, an authorized user enters the correct authentication credential (e.g., using a keyboard, touchpad, etc.) and the obfuscation module 206 adds the noise values to the entered authentication credential prior to transmission. This provides protection against man in the middle type attacks where the data transmission transmitted as part of an authentication request are intercepted by an ill-intentioned user. The addition of the noise values obfuscates the transmitted authentication credential, which may prevent an ill-intentioned user from properly determining the authentication credential.

The obfuscation module 206 may add the noise values prior to the data encoder 204 encoding the authentication credential or after the data encoder 204 has encoded the authentication credential. For example, the obfuscation module 206 may receive the authentication credential provided by a user and then add one or more noise values (e.g., characters) to the authentication credential, resulting in an obfuscated authentication credential. The obfuscation module 206 may then provide the obfuscated authentication credential to the data encoder 204 to be encoded. Accordingly, the data encoder 204 will encode each noise value (e.g., character) added to the authentication credential by the obfuscation module 206 as well as each value of the authentication credential itself. A similar outcome results in embodiments in which a user adds the noise values to the authentication credential. That is, the added noise values are encoded by the data encoder 204 along with each individual value of the authentication credential provided by the user.

In another embodiment, however, the obfuscation module 206 adds the noise values to the authentication credential after it has been encoded by the data encoder 204. In this of scenario, the noise values that are added by the obfuscation module 206 are not encoded by the data encoder 204. Rather, the noise values are added to the resulting encoding of one or more of the values (e.g., characters) of the authentication credential.

The obfuscation module 206 may add noise values randomly or according to a specified order. For example, the obfuscation module 206 may select a number of noise values to add, the value of each respective noise value to be added, and/or a position or positions at which to add the noise values at random. As another example, the obfuscation module 206 may select one or more of the number of noise values to add, the value of each respective noise value to be added, and/or a position or positions at which to add the noise values based on a predetermined listing of modifications. Alternatively, the obfuscation module 206 may maintain a log of the modifications performed when generating an obfuscated authentication credential (e.g., the number of noise values added, the value of each respective noise value added, the position of each added noise value). The obfuscation module 206 may then use the log to ensure that a similar pattern of the number of noise values added, the value of each respective noise value added, and the position of each added noise value is not repeated or not repeated within a threshold time frame.

The transmitting module 208 transmits an obfuscated authentication credential to the authentication system 104. This may include an obfuscated authentication credential that has been encoded by the data encoder 204 or an obfuscated authentication credential that has not been encoded by the data encoder 204.

Figure 3:
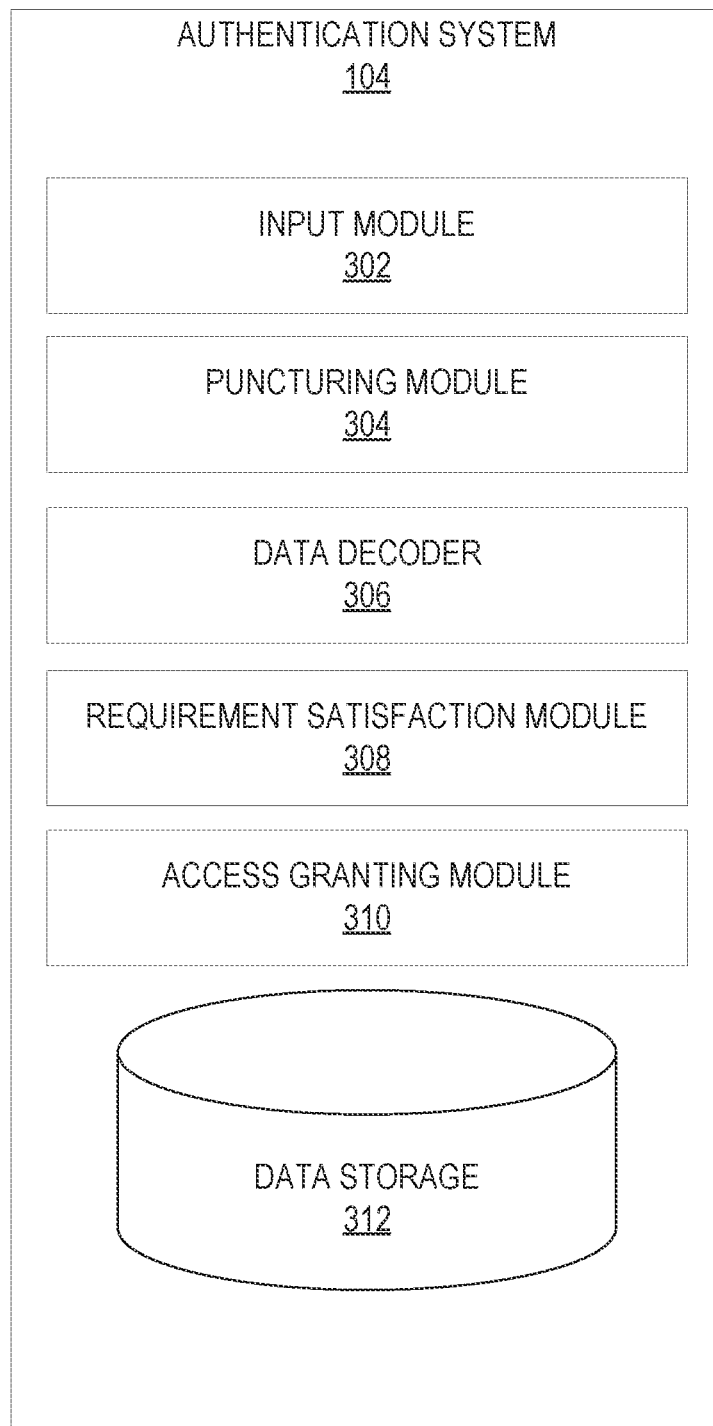
FIG. 3 is a block diagram of an authentication system, according to some example embodiments.

FIG. 3 is a block diagram of an authentication system 104, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the authentication system 104 to facilitate additional functionality that is not specifically described herein. Furthermore, the various functional modules depicted in FIG. 3 may reside on a single computing device or may be distributed across several computing devices in various arrangements such as those used in cloud-based architectures. For example, in some embodiments, the authentication system 104 may be distributed across one or more computing device that provide an online service (e.g., banking service, email service, etc.).

As shown, the authentication system 104 includes an input module 302, a puncturing module 304, a requirement satisfaction determination module 306, an access granting module 308, and a data storage 310.

The input module 302 receives an obfuscated authentication credential from the transmitting device 102 as part of an authentication request. An authentication request is a request to access an access-controlled asset that associated with an authentication requirement that restricts access to the access-controlled asset. For example, to access the access-controlled asset (e.g., an account with an online service) a user must provide an authentication credential (e.g., password) that satisfies the authentication requirement.

The obfuscated authentication credential includes noise values added to the authentication credential to secure the authentication credential from ill-intentioned users. For example, a user may add one or more noise values when entering an authentication credential as part of an authentication request. Alternatively, the transmitting device 102 may add the noise values to the authentication credential provided by the user. For example, the transmitting device 102 may add the noise values before or after encoding the authentication credential.

The puncturing module 304 performs a puncturing process on a received obfuscated authentication credential whereby individual values from the obfuscated authentication credential are removed to generate a punctured authentication credential. For example, the puncturing module 304 selects a set of one or more individual values to remove from the obfuscated authentication credential and generates a punctured authentication credential based on the selected set of individual values. The resulting punctured authentication credential includes a subset of the individual values that were included in the obfuscated authentication credential received by the input module 302.

The puncturing module 304 may select the individual values to remove from the obfuscated authentication credential at random, based on a predetermined order, and/or based on historical data. In some embodiments, the puncturing module 204 maintains a log of the previously selected individual values or combination of individual to ensure that the same individual value or combination of individual values is not selected more than once for a given obfuscated authentication credential.

The puncturing module 304 may puncture an obfuscated authentication credential that has been encoded (e.g., an encoded obfuscated authentication credential) based on the manner in which the noise values were added to the authentication credential. For example, in embodiments in which the noise values were added prior to encoding (e.g., the noise values were encoded as part of the obfuscated authentication credential), the puncturing module 304 may puncture the encoded obfuscated authentication credential by removing one or more sets of individual values that correspond to a single encoded value.

A character added to an authentication credential may be represented as an ordered set of individual values (e.g., 0001). Encoding the ordered set of individual values results in multiple data blocks that add redundancy to the ordered set of individual values (e.g., 0001 0001 0001 0001). To remove noise values from the encoded obfuscated authentication credential, the puncturing module 204 removes the entire set of individual values (e.g., 0001 0001 0001 0001) that correspond to one encoded value (e.g., 0001).

In other embodiments in which the noise values were added prior to encoding, the puncturing module 304 may puncture the obfuscated authentication credential after the obfuscated authentication credential has been decoded by the data decoder 306. The data decoder 306 is a device or program that translates encoded data into its original format (e.g., decodes the encoded data). For example, the data decoder 306 maps encoded data to its corresponding original format using any of a variety of known techniques.

In embodiments in which noise values are added to the authentication credential after encoding (e.g., the noise values are not encoded), the puncturing module 204 may remove individual values from the data blocks when puncturing the encoded obfuscated authentication credential. For example, an authentication credential that is encoded into multiple data blocks to add redundancy to the ordered set of individual values (e.g., 0001 0001 0001 0001) may have one or more individual noise values added to one or more of the data blocks (e.g., 10001 01001 0001 0001) to obfuscate the authentication credential. In this type of embodiment, the puncturing module 304 may remove individual values (e.g., single bits) rather than the entire set of individual values (e.g., 0001 0001 0001 0001) that correspond to one encoded value (e.g., 0001).

In embodiments in which noise values are added to the authentication credential after encoding, the data decoder 306 decodes the punctured authentication credential. That is the data decoder 306 decodes the obfuscated authentication credential after it has been punctured by the puncturing module 304.

The requirement satisfaction module 308 determines whether the punctured authentication credential satisfies the authentication requirement associated with an access-controlled asset. For example, the requirement satisfaction module 308 determines whether the punctured authentication credential corresponds to a stored authentication credential associated with the access-controlled asset. The stored authentication asset is stored in the data storage 312. Accordingly, the requirement satisfaction module 308 gathers the stored authentication credential from the data storage 312.

The requirement satisfaction module 308 determines whether the punctured authentication credential corresponds to the stored authentication credential. For example, the requirement satisfaction module 308 determines whether the punctured authentication credential is an exact match with the stored authentication credential or satisfies a threshold similarity with the stored authentication credential.

The access granting module 310 approves an authentication request in response to the requirement satisfaction module 308 determining that the punctured authentication credential corresponds to the stored authentication credential (e.g., the authentication requirement is satisfied). Alternatively, the access granting module 310 may deny the authentication request in response to determining that the punctured authentication credential does not correspond to the stored authentication credential (e.g., the authentication requirement is not satisfied).

The access granting module 310 approves an authentication request by providing a requesting user with access to the access-controlled asset. For example, the access granting module 310 grants the requesting user with access to the access-controlled asset (e.g., returns a requested file, causes a door to unlock or open, provides the transmitting device 102 with access to a user account, etc.). Alternatively, the access granting module 310 transmits a notification to an online service indicating that the requesting user has satisfied the authentication requirement and should be granted access to the access-controlled resource. In this type of embodiment, the online service grants the grants the requesting user with access to the access-controlled asset.

To confirm whether an obfuscated authentication credential corresponds to the stored authentication credential, the authentication system 104 may repeat the puncturing process multiple times. For example, the puncturing module 304 selects different combinations of individual values from the obfuscated authentication credential to generate multiple punctured authentication credentials. The requirement satisfaction module 308 determines whether any of the punctured authentication credentials correspond to the stored authentication credential. The authentication system 104 may repeat this process until a punctured authentication credential is determined to correspond to the stored authentication credential, a timeout occurs, or each potential punctured authentication credential has been generated and determined to not correspond to the stored authentication credential. The authentication system 104 may perform the puncturing process sequentially or in sequence. For example, the puncturing module 304 may generate multiple punctured authentication credentials at the same time or, alternatively, in response to each previously generated punctured authentication credential being determined by the requirement satisfaction module 308 to not correspond to the stored authentication credential (e.g., not satisfy the authentication requirement).

Figure 4:
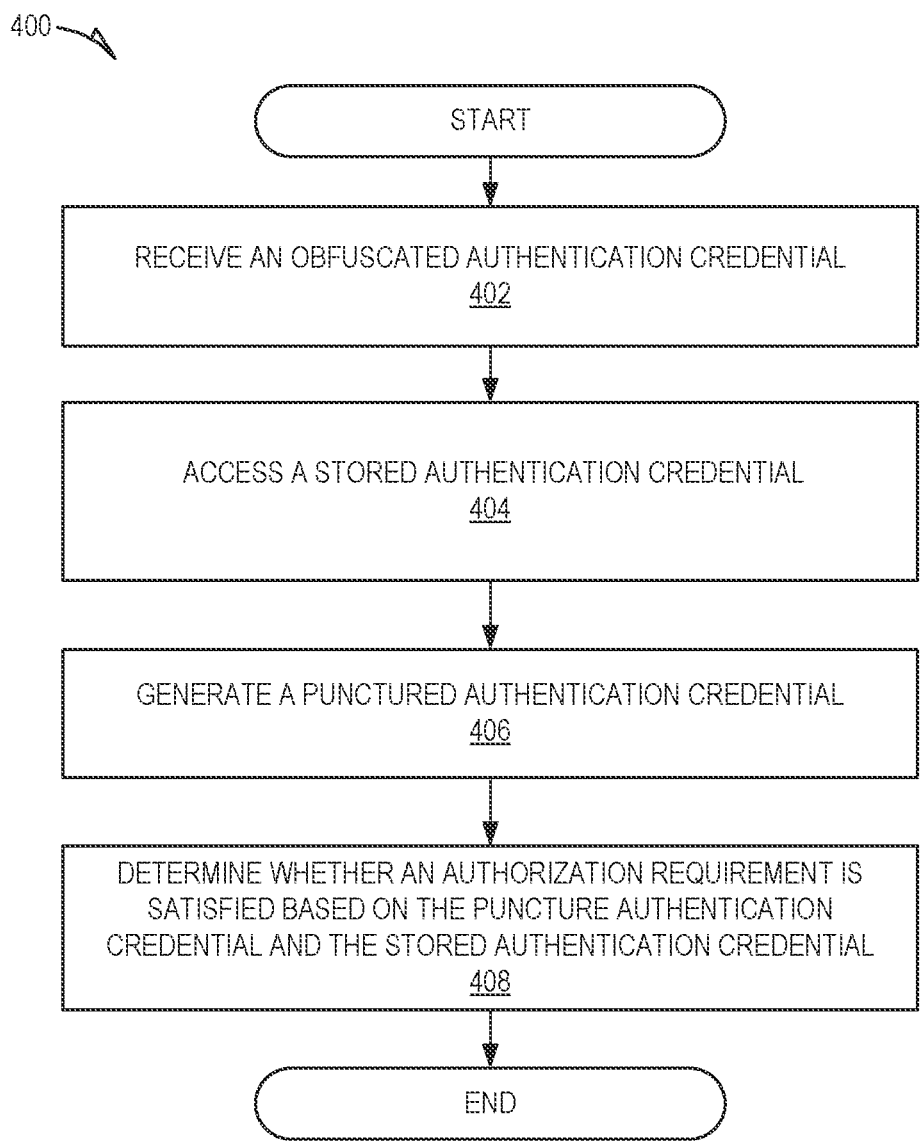
FIG. 4 is a flowchart showing an example method for providing secure authentication using puncturing, according to certain example embodiments.

FIG. 4 is a flowchart showing an example method 400 for providing secure authentication using puncturing, according to certain example embodiments. The method 400 may be embodied in computer readable instructions for execution by one or more processors such that the operations of the method 400 may be performed in part or in whole by the authentication system 104; accordingly, the method 400 is described below by way of example with reference thereto. However, it shall be appreciated that at least some of the operations of the method 400 may be deployed on various other hardware configurations and the method 400 is not intended to be limited to the authentication system 104.

At operation 402, the input module 302 receives an obfuscated authentication credential. The input module 302 receives the obfuscated authentication credential from a transmitting device 102 as part of an authentication request. An authentication request is a request to access an access-controlled asset that is associated with an authentication requirement that restricts access to the access-controlled asset. For example, to access the access-controlled asset (e.g., an account with an online service) a user must provide an authentication credential (e.g., password) that satisfies the authentication requirement.

The obfuscated authentication credential includes noise values added to the authentication credential to secure the authentication credential from ill-intentioned users. For example, a user may add one or more noise values when entering an authentication credential as part of an authentication request. Alternatively, the transmitting device 102 may add the noise values to the authentication credential provided by the user. For example, the transmitting device 102 may add the noise values before or after encoding the authentication credential.

The authentication request may include data identifying the access-controlled resource that the requesting user wishes to access. For example, the authentication request may include a unique identifier associated with the access-controlled resource.

At operation 404, the requirement satisfaction module 308 accesses a stored authentication credential. The stored authentication credential is stored in the data storage 312 and associated with the access-controlled asset. Accordingly, the requirement satisfaction module 308 gathers the stored authentication credential from the data storage 312. For example, the requirement satisfaction module 308 uses the unique identifier associated with the access-controlled resource to identify the stored authentication credential in the data storage 312.

At operation 406, the puncturing module 304 generates a punctured authentication credential. For example, the puncturing module 304 selects a set of one or more individual values to remove from the obfuscated authentication credential and generates a punctured authentication credential based on the selected set of individual values. The resulting punctured authentication credential includes a subset of the individual values that were included in the obfuscated authentication credential received by the input module 302.

The puncturing module 304 may select the individual values to remove from the obfuscated authentication credential at random, based on a predetermined order, and/or based on historical data. In some embodiments, the puncturing module 204 maintains a log of the previously selected individual values or combination of individual to ensure that the same individual value or combination of individual values is not selected more than once for a given obfuscated authentication credential.

The puncturing module 304 may puncture an obfuscated authentication credential that has been encoded (e.g., an encoded obfuscated authentication credential) based on the manner in which the noise values were added to the authentication credential. For example, in embodiments in which the noise values were added prior to encoding (e.g., the noise values were encoded as part of the obfuscated authentication credential), the puncturing module 304 may puncture the encoded obfuscated authentication credential by removing one or more sets of individual values that correspond to a single encoded value.

A character added to an authentication credential may be represented as an ordered set of individual values (e.g., 0001). Encoding the ordered set of individual values results in multiple data blocks that add redundancy to the ordered set of individual values (e.g., 0001 0001 0001 0001). To remove noise values from the encoded obfuscated authentication credential, the puncturing module 204 removes the entire set of individual values (e.g., 0001 0001 0001 0001) that correspond to one encoded value (e.g., 0001).

In other embodiments in which the noise values were added prior to encoding, the puncturing module 304 may puncture the obfuscated authentication credential after the obfuscated authentication credential has been decoded by the data decoder 306. The data decoder 306 is a device or program that translates encoded data into its original format (e.g., decodes the encoded data). For example, the data decoder 306 maps encoded data to its corresponding original format using any of a variety of known techniques.

In embodiments in which noise values are added to the authentication credential after encoding (e.g., the noise values are not encoded), the puncturing module 204 may remove individual values from the data blocks when puncturing the encoded obfuscated authentication credential. For example, an authentication credential that is encoded into multiple data blocks to add redundancy to the ordered set of individual values (e.g., 0001 0001 0001 0001) may have one or more individual noise values added to one or more of the data blocks (e.g., 10001 01001 0001 0001) to obfuscate the authentication credential. In this type of embodiment, the puncturing module 304 may remove individual values (e.g., single bits) rather than the entire set of individual values (e.g., 0001 0001 0001 0001) that correspond to one encoded value (e.g., 0001).

In embodiments in which noise values are added to the authentication credential after encoding, the data decoder 306 decodes the punctured authentication credential. That is the data decoder 306 decodes the obfuscated authentication credential after it has been punctured by the puncturing module 304.

At operation 408, the requirement satisfaction module 308 determines whether an authorization requirement is satisfied based on the punctured authentication credential and the stored authentication credential. For example, the requirement satisfaction module 308 determines whether the punctured authentication credential corresponds to the stored authentication credential associated with the access-controlled asset. The requirement satisfaction module 308 determines whether the punctured authentication credential corresponds to the stored authentication credential by determining whether the punctured authentication credential is an exact match with the stored authentication credential or satisfies a threshold similarity with the stored authentication credential.

To confirm whether an obfuscated authentication credential corresponds to the stored authentication credential, the authentication system 104 may repeat the puncturing process multiple times. For example, the puncturing module 304 selects different combinations of individual values from the obfuscated authentication credential to generate multiple punctured authentication credentials. The requirement satisfaction module 308 determines whether any of the punctured authentication credentials correspond to the stored authentication credential. The authentication system 104 may repeat this process until a punctured authentication credential is determined to correspond to the stored authentication credential, a timeout occurs, or each potential punctured authentication credential has been generated and determined to not correspond to the stored authentication credential. The authentication system 104 may perform the puncturing process sequentially or in sequence. For example, the puncturing module 304 may generate multiple punctured authentication credentials at the same time or, alternatively, in response to each previously generated punctured authentication credential being determined by the requirement satisfaction module 308 to not correspond to the stored authentication credential (e.g., not satisfy the authentication requirement).

Figure 5:
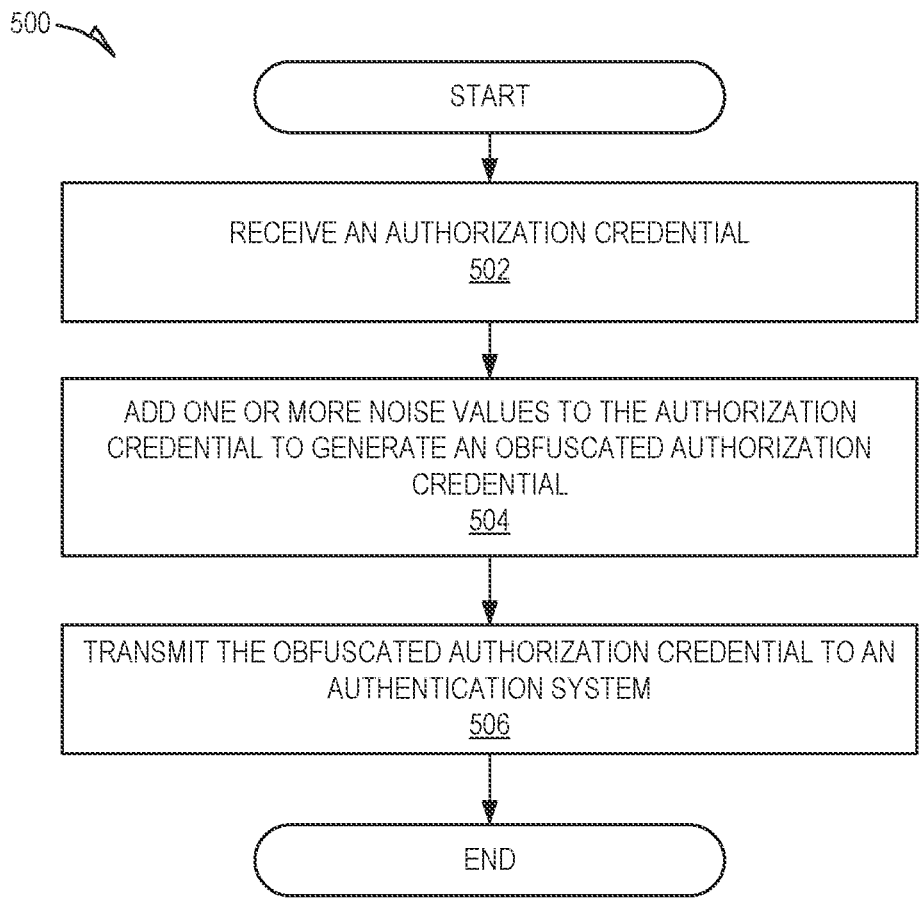
FIG. 5 is a flowchart showing another example method for generating an obfuscated authentication credential, according to certain example embodiments.

FIG. 5 is a flowchart showing another example method for generating an obfuscated authentication credential, according to certain example embodiments. The method 500 may be embodied in computer readable instructions for execution by one or more processors such that the operations of the method 500 may be performed in part or in whole by the client-side application 108; accordingly, the method 500 is described below by way of example with reference thereto. However, it shall be appreciated that at least some of the operations of the method 500 may be deployed on various other hardware configurations and the method 500 is not intended to be limited to the client-side application 108.

At operation 502, the interface module 202 receives an authorization credential. The interface module 202 present a user interface on a display of a transmitting device 102. The user interface allows a user to interact with and/or use the functionality of the authentication system 104, as well as an online service that utilizes the functionality of the authentication system 104. For example, the interface module receives data from the authentication system 104 and/or on online service and presents the received data in the user interface presented on the display of the transmitting device 102. Further, the interface module 202 transmits data to the authentication system 104 and/or on online service, such as requests for specified data. For example, the interface module 202 may provide user interface elements (e.g., buttons, text boxes, etc.) within the user interface that allows a user to make selections, enter data, etc. The user may use these user interface elements to request to view data, causing the interface module 202 to transmit a request to the authentication system 104 and/or on online service for the requested data.

A user can use the functionality provided by the interface module 202 to initiate an authentication request associated with an access-controlled resource. For example, the user may initiate access to an access-controlled resource, such as by selecting a file or attempting to login to an account that has an associated authentication requirement. The user interface facilitated by the interface module 202 may present a prompt to enter the authentication credential that satisfies the authentication request. Further, the interface module 202 may enable a user to enter the authentication credential as part of the authentication request.

At operation 504, the obfuscation module 206 adds of one or more noise values to the authorization credential to generate an obfuscated authorization credential. In some embodiments, the client-side application 108 is tasked with adding noise values to an authentication credential, rather than a user entering the noise values. For example, the obfuscation module 206 adds one or more noise values to an authentication credential entered by a user prior to the authentication credential being transmitted to the authentication system 104 as part of an authentication request. In this type of embodiment, an authorized user enters the correct authentication credential (e.g., using a keyboard, touchpad, etc.) and the obfuscation module 206 adds the noise values to the entered authentication credential prior to transmission. This provides protection against man in the middle type attacks where the data transmission transmitted as part of an authentication request are intercepted by an ill-intentioned user. The addition of the noise values obfuscates the transmitted authentication credential, which may prevent an ill-intentioned user from properly determining the authentication credential.

The obfuscation module 206 may add the noise values prior to the data encoder 204 encoding the authentication credential or after the data encoder 204 has encoded the authentication credential. For example, the obfuscation module 206 may receive the authentication credential provided by a user and then add one or more noise values (e.g., characters) to the authentication credential, resulting in an obfuscated authentication credential. The obfuscation module 206 may then provide the obfuscated authentication credential to the data encoder 204 to be encoded. Accordingly, the data encoder 204 will encode each noise value (e.g., character) added to the authentication credential by the obfuscation module 206 as well as each value of the authentication credential itself. A similar outcome results in embodiments in which a user adds the noise values to the authentication credential. That is, the added noise values are encoded by the data encoder 204 along with each individual value of the authentication credential provided by the user.

In another embodiment, however, the obfuscation module 206 adds the noise values to the authentication credential after it has been encoded by the data encoder 204. In this of scenario, the noise values that are added by the obfuscation module 206 are not encoded by the data encoder 204. Rather, the noise values are added to the resulting encoding of one or more of the values (e.g., characters) of the authentication credential.

The obfuscation module 206 may add noise values randomly or according to a specified order. For example, the obfuscation module 206 may select a number of noise values to add, the value of each respective noise value to be added, and/or a position or positions at which to add the noise values at random. As another example, the obfuscation module 206 may select one or more of the number of noise values to add, the value of each respective noise value to be added, and/or a position or positions at which to add the noise values based on a predetermined listing of modifications. Alternatively, the obfuscation module 206 may maintain a log of the modifications performed when generating an obfuscated authentication credential (e.g., the number of noise values added, the value of each respective noise value added, the position of each added noise value). The obfuscation module 206 may then use the log to ensure that a similar pattern of the number of noise values added, the value of each respective noise value added, and the position of each added noise value is not repeated or not repeated within a threshold time frame.

At operation 506, the transmitting module 208 transmits the obfuscated authorization credential to the authorization system 104 as part of an authorization request to access an access-controlled resource.

Software Architecture

Figure 6:
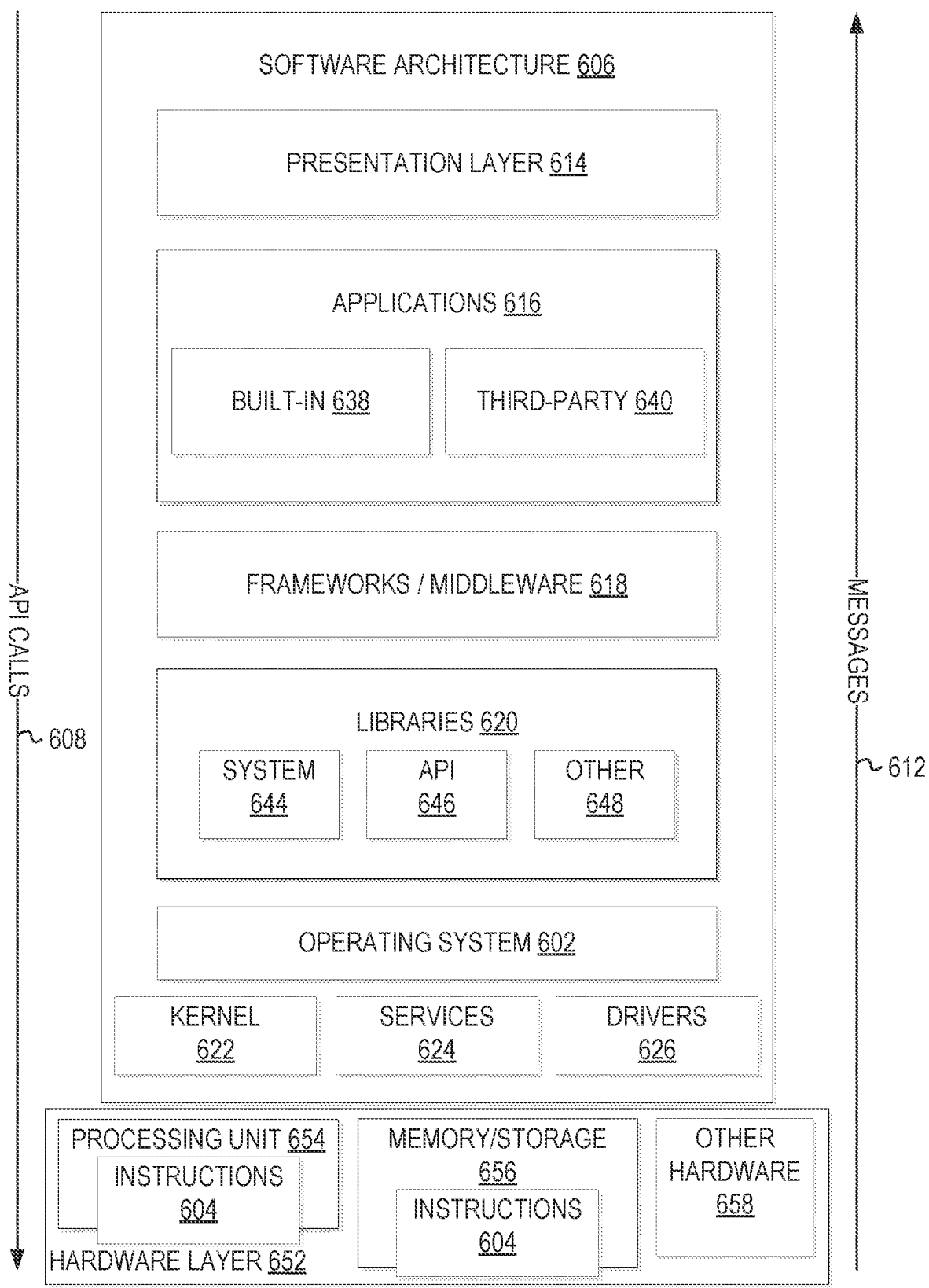
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
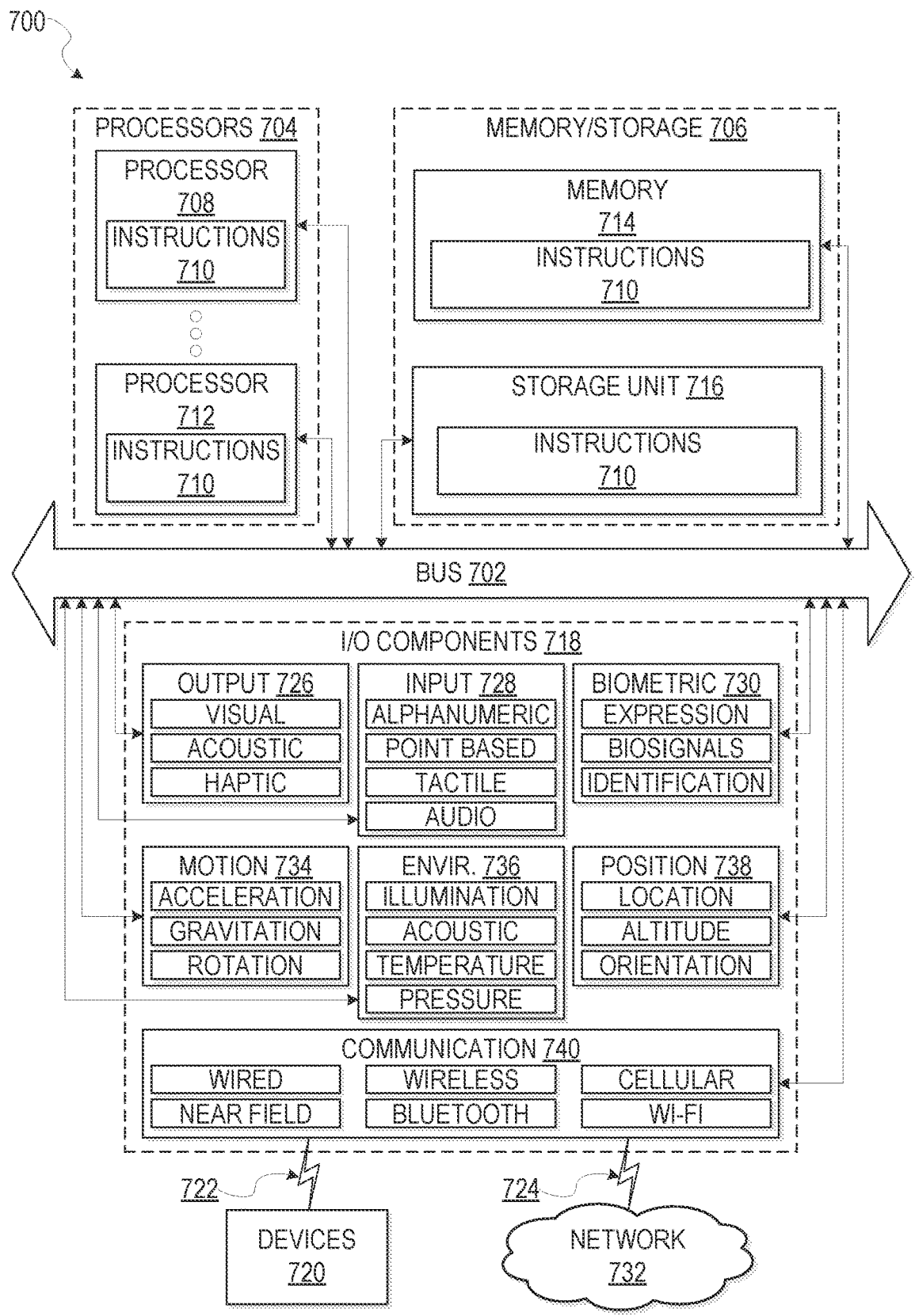
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" refers to "non-transitory" machine-readable mediums and excludes signals or other "transitory" computer readable mediums. A "non-transitory" machine-readable medium is a physical device that can store data for a period of time during which the stored data may be transferrable or reproducible. Examples of a non-transitory machine-readable medium are a physical memory device, Random Access Memory (RAM), etc. In contrast, transitory machine-readable mediums are not physical and store data only momentarily, such as a signal.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method to authenticate access to an access-controlled resource, the method comprising:
    receiving, from a transmitting computing device, an encoded obfuscated authentication credential as part of an authentication request, the encoded obfuscated authentication credential including a set of individual values, the encoded obfuscated authentication credential having been generated based on a first set of characters;
    accessing a stored authentication credential, the stored authentication credential including a second set of characters;
    performing a first puncturing of the encoded obfuscated authentication credential by removing at least one randomly selected individual value from the set of individual values, the first puncturing yielding a first punctured authentication credential, the first punctured authentication credential including a first subset of the individual values from the set of individual values;
    determining whether the first punctured encoded data input corresponds to at least a portion of the stored authentication credential; and
    in response to determining that the first punctured encoded data input corresponds to at least the portion of the stored authentication credential, approving the authentication request.

2. The method of claim 1, wherein the first set of characters was provided to the transmitting computing device via an input of the transmitting computing device, the first set of characters including at least one noise value, wherein a number of characters in the first set of characters is greater than a number of characters in the second set of characters.

3. The method of claim 1, wherein the first set of characters includes a received set of characters provided to the transmitting computing device via an input of the transmitting computing device and at least one additional character selected by the transmitting computing device, wherein a number of characters in the first set of characters is no greater than a number of characters in the second set of characters.

4. The method of claim 1, wherein the encoded obfuscated authentication credential was generated by the transmitting computing device by adding at least one additional individual value to a second set of individual values resulting from encoding the first set of characters, the first set of characters having been provided to the transmitting computing device via an input of the transmitting computing device, wherein a number of characters in the first set of characters is equal to a number of characters in the second set of characters and the at least one additional individual value having been selected by the transmitting computing device.

5. The method of claim 1, further comprising:
performing a second puncturing of the encoded obfuscated authentication credential, the second puncturing yielding a second punctured authentication credential, the second punctured authentication credential including a second subset of the individual values from the set of individual values, the second subset of the individual values being different than the first subset of the individual values;
determining whether the second punctured encoded data input corresponds to at least the portion of the stored authentication credential; and
in response to determining that the second punctured encoded data input corresponds to at least the portion of the stored authentication credential, approving the authentication request.

6. The method of claim 5, wherein the second puncturing is performed sequentially after the first puncturing.

7. The method of claim 5, wherein the second puncturing is performed at least partially concurrently with the first puncturing.

8. The method of claim 1, further comprising:
in response to determining that the first punctured encoded data input does not correspond to at least the portion of the stored authentication credential, performing additional puncturing of the encoded obfuscated authentication credential until a punctured authentication credential is determined to correspond to at least the portion of the stored authentication credential or a timeout occurs.

9. The method of claim 1, wherein
the at least one individual value is an encoded representation of a first character that was encoded as part of the authentication request.

10. The method of claim 1, wherein the encoded obfuscated authentication credential is encoded using forward error correction.

11. A system comprising:
one or more computer processors; and
one or more computer-readable mediums storing instruction that, when executed by the one or more computer processors, cause the system to perform operations for authenticating access to an access-controlled resource, the operations comprising:
receiving, from a transmitting computing device, an encoded obfuscated authentication credential as part of an authentication request, the encoded obfuscated authentication credential including a set of individual values, the encoded obfuscated authentication credential having been generated based on a first set of characters;
accessing a stored authentication credential, the stored authentication credential including a second set of characters;
performing a first puncturing of the encoded obfuscated authentication credential by removing at least one randomly selected individual value from the set of individual values, the first puncturing yielding a first punctured authentication credential, the first punctured authentication credential including a first subset of the individual values from the set of individual values;
determining whether the first punctured encoded data input corresponds to at least a portion of the stored authentication credential; and
in response to determining that the first punctured encoded data input corresponds to at least the portion of the stored authentication credential, approving the authentication request.

12. The system of claim 11, wherein the first set of characters was provided to the transmitting computing device via an input of the transmitting computing device, the first set of characters including at least one noise value, wherein a number of characters in the first set of characters is greater than a number of characters in the second set of characters.

13. The system of claim 11, wherein the first set of characters includes a received set of characters provided to the transmitting computing device via an input of the transmitting computing device and at least one additional character selected by the transmitting computing device, wherein a number of characters in the first set of characters is no greater than a number of characters in the second set of characters.

14. The system of claim 11, wherein the encoded obfuscated authentication credential was generated by the transmitting computing device by adding at least one additional individual value to a second set of individual values resulting from encoding the first set of characters, the first set of characters having been provided to the transmitting computing device via an input of the transmitting computing device, wherein a number of characters in the first set of characters is equal to a number of characters in the second set of characters and the at least one additional individual value having been selected by the transmitting computing device.

15. The system of claim 11, wherein the operations comprise:
in response to determining that the first punctured encoded data input does not correspond to at least the portion of the stored authentication credential, performing additional puncturing of the encoded obfuscated authentication credential until a punctured authentication credential is determined to correspond to at least the portion of the stored authentication credential or a timeout occurs.

16. A non-transitory computer-readable medium storing instruction that, when executed by one or more computer processors of one or more computing devices, cause the one or more computing devices to perform operations for authenticating access to an access-controlled resource, the operations comprising:
receiving, from a transmitting computing device, an encoded obfuscated authentication credential as part of an authentication request, the encoded obfuscated authentication credential including a set of individual values, the encoded obfuscated authentication credential having been generated based on a first set of characters;
accessing a stored authentication credential, the stored authentication credential including a second set of characters;
performing a first puncturing of the encoded obfuscated authentication credential by removing at least one randomly selected individual value from the set of individual values, the first puncturing yielding a first punctured authentication credential, the first punctured authentication credential including a first subset of the individual values from the set of individual values;

determining whether the first punctured encoded data input corresponds to at least a portion of the stored authentication credential; and in response to determining that the first punctured encoded data input corresponds to at least the portion of the stored authentication credential, approving the authentication request.

17. The non-transitory computer-readable medium of claim 16, wherein the operations comprise:

in response to determining that the first punctured encoded data input does not correspond to at least the portion of the stored authentication credential, performing additional puncturing of the encoded obfuscated authentication credential until a punctured authentication credential is determined to correspond to at least the portion of the stored authentication credential or a timeout occurs.

* * * * *